(12) United States Patent
Olsson (10) Patent No.: US 11,953,643 B1
(45) Date of Patent: Apr. 9, 2024

(54) MAP GENERATION SYSTEMS AND METHODS BASED ON UTILITY LINE POSITION AND ORIENTATION ESTIMATES

(71) Applicant: SeeScan, Inc., San Diego, CA (US)

(72) Inventor: Mark S. Olsson, La Jolla, CA (US)

(73) Assignee: SeeScan, Inc., San Diego, CA (US)

( * ) Notice: Subject to any disclaimer, the term of this patent is extended or adjusted under 35 U.S.C. 154(b) by 432 days.

(21) Appl. No.: 16/701,085

(22) Filed: Dec. 2, 2019

Related U.S. Application Data (60) Provisional application No. 62/777,045, filed on Dec. 7, 2018.

(51) Int. Cl.
    *G06F 11/30*    (2006.01)
    *G01V 3/08*     (2006.01)
    *G09B 29/00*   (2006.01)

(52) U.S. Cl.
    CPC .......... *G01V 3/081* (2013.01); *G09B 29/007* (2013.01)

(58) Field of Classification Search
    CPC ...................................................... G01V 3/081
    See application file for complete search history.

(56) References Cited

U.S. PATENT DOCUMENTS

2016/0141766 A1*    5/2016    Olsson ................ H01Q 21/205
                                                                                                                                                               343/728

\* cited by examiner

*Primary Examiner* — Phuong Huynh
(74) *Attorney, Agent, or Firm* — Steven C. Tietsworth, Esq.; Michael J. Pennington, Esq.

(57) ABSTRACT

System for generating maps from magnetic field utility line estimates include one or more vehicle-mounted magnetic field sensing locators, one or more antenna nodes to sense magnetic fields emitted from buried utilities, a receiver circuit to process the antenna signals, a position and orientation element to determine the position and orientation of the magnetic field sensing locating device in a world coordinate system, a processing unit to generate at one or more discrete points an estimation of one or more utility positions and orientations, and a map generation element to generate an associated map.

25 Claims, 7 Drawing Sheets
(1 of 7 Drawing Sheet(s) Filed in Color)

202 Generate at one or more discrete points an estimation of one or more utility positions and orientations via a utility position and orientation estimating device

204 Generate a map for display on a display device, wherein the map includes a plurality of line segments estimative of utility line positions and orientations and each of the line segments corresponds to one discrete point estimate of utility position and orientation

212
Generate at one or more discrete points an estimation of one or more utility positions and orientations via a utility position and orientation estimating device

214
Determine aspects associated with each discrete point of utility line position and orientation estimation (e.g., measured signal strength, current, phase, depth of utility) to be represented in the line segment characteristics (e.g., line segment color or saturation, line width or length, pattern or styling of line, and/or opacity)

216
Generate a map for display on a display device, wherein the map includes a plurality of line segments estimative of utility line positions and orientations and each of the line segments corresponds to one discrete point estimate of utility position and orientation wherein the characteristics of each line segment may be indicative of aspects of each associated with discrete point of utility line position and orientation estimation

282
Generate at one or more discrete points an estimation of one or more utility positions and orientations via a utility position and orientation estimating device

284
Generate a map for display on a display device, wherein the map includes a plurality of spline or curve control points each with a tangency estimative of utility line positions and orientations and each of the spline or curve control points segments corresponds to one discrete point estimate of utility position and orientation.

MAP GENERATION SYSTEMS AND METHODS BASED ON UTILITY LINE POSITION AND ORIENTATION ESTIMATES

FIELD

This disclosure relates generally to methods and systems for map generation based on data predictive of buried utility and other conductor locations. More specifically, but not exclusively, this disclosure relates to methods and systems for map generation, storage, and display based on data presented so as to display estimated utility line or other hidden or buried conductor location data gathered at a plurality of discrete points.

BACKGROUND

In many situations it is necessary to know the location of utility lines buried in the Earth (e.g., sewer, water, gas, electrical conduits, fiber optic conduits, or the like). For instance, inspection, repair, or upgrading of buried utility lines often requires digging into the ground to excavate utility lines. Knowledge of utility locations is necessary in order to facilitate safe excavations and avoid costly damage to infrastructure and loss of human lives.

Devices and systems known in the art to locate buried utility lines, referred to herein as "magnetic field sensing locating devices" or "utility locators" or "utility locating devices," may include one or more antennas configured to sense magnetic fields emitted by the utility lines. In use, the utility locator may be carried by a user trained to interpret the sensed magnetic field data in an attempt to locate and trace along each utility line. Such operations may generally be costly in terms of the hours it may require an operator to perform the locate operation. Furthermore, such operations may be subject to human errors that may result in missed or improperly located utilities.

Such locate data may further be incorporated into a map indicating user determined utility positions. Utility maps known in the art generally include a continuous line or similar continuous visual representation for each traced utility.

Accordingly, there is a need in the art to address the above-described as well as other problems.

SUMMARY

This disclosure relates generally to methods and systems for map generation based on data predictive of utility locations. More specifically, but not exclusively, this disclosure relates to methods and systems for map generation based on data predictive of utility locations used to display estimated utility line locations data gathered at a plurality of discrete points.

According to one aspect, a method for generating maps based on utility line positions and orientations is disclosed. The method may include generating an estimation of one or more utility positions and orientations via a utility position and orientation estimating device at one or more discrete points. The method may further include generating a map for display on a display device, wherein the map includes a plurality of line segments estimative of utility line positions and orientations and each of the line segments corresponds to one discrete point estimate of utility position and orientation.

In another aspect, another method for generating maps based on utility line positions and orientations is disclosed. The method may include generating an estimation of one or more utility positions and orientations via a utility position and orientation estimating device at one or more discrete points. The method may further include generating a map for display on a display device, wherein the map includes a plurality of spline or curve control points each with a tangency estimative of utility line positions and orientations, and each of the spline or curve control points segments corresponds to one discrete point estimate of utility position and orientation.

In another aspect, the present disclosure includes a system for generating maps. The system may include one or more magnetic field sensing locating devices including one or more of vehicle-mounted magnetic field sensing locating devices and/or hand-carried magnetic field sensing devices. Each magnetic field sensing locating device may include at least one antenna node to sense magnetic fields emitted from a plurality of buried utilities at one or more point locations along the Earth's surface and provide antenna output signals corresponding to the sensed magnetic fields. The magnetic field sensing locating devices may further include a receiver circuit to receive and process the at least one antenna node output signals to provide receiver output signals corresponding to the received magnetic field signals. The magnetic field sensing locating devices may include a position and orientation element to determine the position and orientation of the magnetic field sensing locating device in a world coordinate system. The magnetic field sensing locating devices may further include a processing unit coupled to the receiver output to receive the receiver output signals and position and orientation output signals and generate at one or more discrete points an estimation of one or more utility positions and orientations via a utility position and orientation estimating device. The system may include a map generation element to receive the processing unit data and generate a map including a plurality of line segments estimative of utility line positions and orientations wherein each of the line segments corresponds to one discrete point estimate of utility position and orientation. The system may further include a display device to receive map generation output data and to display the map.

Various additional aspects, features, devices, systems, and functionality are further described below in conjunction with the appended Drawings.

BRIEF DESCRIPTION OF THE DRAWINGS

The application file contains a drawing figure, denoted as FIG. 1, that is executed in color. Copies of this patent application with the color drawing will be provided by the Office upon request and payment of the necessary fee.

The present application may be more fully appreciated in connection with the following detailed description taken in conjunction with the accompanying Drawings, wherein.

DESCRIPTION OF EMBODIMENTS

Terminology

As used herein, the term "utility position and orientation estimating device" may include any device or system configured to determine the position and orientation of one or more utility lines which may be buried in the ground. In some embodiments, the utility position and orientation estimating devices may be or include one or more "magnetic field sensing locating devices" also referred to herein as "utility locators," "utility locating devices," "locating devices," and "locators." Such magnetic field sensing locating devices may refer to devices for sensing and measuring "signals" or radiation of electromagnetic energy. The magnetic field sensing locating devices herein may further process the received signals to determine information about hidden or buried conductors (e.g., underground utilities such as pipes, conduits, or cables) and the associated underground environment, which may be done at discrete points in the surveyed area. The utility locators may further generate or measure aspects of the magnetic signals and surrounding environment which may be referred to as "locate data" or "locate point data" or "utility data" or "utility locate data" herein.

The term "buried utilities" or "utility lines" or "utility" as used herein refers not only to utilities below the surface of the ground, but also to utilities that are otherwise obscured, covered, or hidden from direct view or access (e.g. overhead power lines, underwater utilities, and the like).

The term "magnetic field signals" or "magnetic fields" as used herein may refer to radiation of electromagnetic energy at the locate area. The magnetic field signals may further refer to radiation of electromagnetic energy from remote transmission sources measurable within the locate area.

The term "world coordinate system" as used herein refers to a coordinate system used to specify every terrestrial location by identifying numbers or other values. For instance, the world coordinate system may be latitude and longitude designations determined by a global positioning satellite system or like position determining system.

The term "line segment" as used herein may refer to a line segment marking on a map corresponding to estimations of a utility lines location. In some embodiments, the line segments may be two dimensional revealing estimated utility line position and orientation in a two dimensional utility map. In other embodiments, the line segments may be three dimensionally configured for display in a three dimensional utility map.

The term "computing device" as used herein refers to any device or system that can be operated or controlled by electrical, optical, or other outputs from a user interface "electronic device." Examples of user electronic devices include, but are not limited to, vehicle-mounted display devices, navigation systems such as global positioning system receivers, personal computers, notebook or laptop computers, personal digital assistants (PDAs), cellular phones, computer tablet devices, electronic test or measurement equipment including processing units, and/or other similar systems or devices. In a particular embodiment of the present disclosure, the electronic device may include a map application, which is a software stored on a non-transitory tangible medium within or coupled to the electronic device configured to receive, send, generate, modify, display, store, and/or otherwise use or manipulate a map or its associated objects.

As used herein, the term "map" refers to imagery, diagrams, schematics, graphical illustrations, line drawings or other representations depicting the attributes of a location and/or continuum of line segments estimative of utility line positions/orientations, which may include maps or images containing various dimensions (i.e. two dimensional maps or images and/or three dimensional maps or images). These may be vector or raster objects and/or combinations of both. Such depictions and/or representations may be used for navigation and/or relaying information associated with positions or locations, and may also contain information associated with the positions or locations such as coordinates, information defining features, images or video depictions, and/or other related data or information. Various other data may be embedded or otherwise included in maps including, but not limited to, reference coordinate information such as latitude, longitude, and/or altitude data, topographical information, virtual models/objects, information regarding buried utilities or other associated objects or elements, structures on or below the surface, and the like.

The term "base map" refers to the map without the addition of the predicted utility location. Wherein the map is a "utility map" as used herein, the utility maps may depict a number of estimations of the location of utility lines which may be buried beneath the ground and other associated information such as probable orientation and depth of the buried utilities. For instance, a plurality of discrete points of estimation may result in a number of line segments that may estimate the utility line position and orientation in the surveyed area.

The term "communicatively coupled" as used herein may refer to a link for exchange of information between locating devices, remote servers, and/or other system devices. Such a link may be transmitted via wire or cable or wirelessly, for instance, through Wi-Fi, Bluetooth, or using like wireless communication devices or protocols. Such communicative couplings may occur in real-time or near-real time or in post process. For instance, in some embodiments the locating device(s) may connect wirelessly to one or more remote servers for exchanging data in real-time or near-real time for processing and further use at the locating device(s). In other embodiments, locate data may be stored within the utility locating device and later transferred to a server or other computing device for processing. Such post processed data may then be downloadable by the same or other locating devices for future use. In yet further embodiments, a combination of real-time or near-real time exchange of data and storage of data for post processing may occur. For instance, some data may be exchanged in real-time or near-real time to one or more remote servers whereas other data is stored at the locating device for later transfer and post processing at a server or other computing device.

As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Overview

This disclosure relates generally to methods and systems for map generation based on data predictive of utility locations. More specifically, but not exclusively, this disclosure relates to methods and systems for map generation based on data predictive of utility locations used to display estimated utility line locations data gathered at a plurality of discrete points.

According to one aspect, a method for generating maps based on utility line positions and orientations is disclosed. The method may include generating an estimation of one or more utility positions and orientations via a utility position and orientation estimating device at one or more discrete points. The method may further include generating a map for display on a display device, wherein the map includes a plurality of line segments estimative of utility line positions and orientations, and each of the line segments corresponds to one discrete point estimate of utility position and orientation. In some embodiments, the map and associated utility position and orientation data may further be stored in a non-transitory computer readable memory.

In another aspect, the map may be combined onto a base map of the geographical region. In some embodiments, the map may, for example, be a three dimensional map.

In another aspect, the utility position and orientation estimating device may be a magnetic field sensing locating device configured to measure magnetic signals emitted by a utility line. The position and orientation of the magnetic field sensing locating device or other utility position and orientation estimating device is determined in a world coordinate system.

In another aspect, aspects associated with discrete point of utility line position and orientation estimation (e.g., measured signal strength, current, phase, depth of utility, locating instrument velocity over the ground) are represented in the line segment characteristics (e.g., line segment color or saturation, line width or length, pattern or styling of line, and/or opacity). As a further example the line segment length may be proportional to data collection velocity.

In another aspect, another method for generating maps based on utility line positions and orientations is disclosed. The method may include generating an estimation of one or more utility positions and orientations via a utility position and orientation estimating device at one or more discrete points. The method may further include generating a map for display on a display device, wherein the map includes a plurality of spline or curve control points each with a tangency estimative of utility line positions and orientations, and each of the spline or curve control points segments corresponds to one discrete point estimate of utility position and orientation.

In another aspect, the present disclosure includes a system for generating maps. The system may include one or more magnetic field sensing locating devices including one or more of vehicle-mounted magnetic field sensing locating devices and/or hand-carried magnetic field sensing devices. Each magnetic field sensing locating device may include at least one antenna node to sense magnetic fields emitted from a plurality of buried utilities at one or more point locations along the Earth's surface and provide antenna output signals corresponding to the sensed magnetic fields. The magnetic field sensing locating devices may further include a receiver circuit to receive and process the at least one antenna node output signal to provide receiver output signals corresponding to the received magnetic field signals. The magnetic field sensing locating devices may include a position and orientation element to determine the position and orientation of the magnetic field sensing locating device in a world coordinate system. The magnetic field sensing locating devices may further include a processing unit coupled to the receiver output to receive the receiver output signals and position and orientation output signals and generate at one or more discrete points an estimation of one or more utility positions and orientations via a utility position and orientation estimating device. The system may include a map generation element to receive the processing unit data and generate a map including a plurality of line segments estimative of utility line positions and orientations wherein each of the line segments corresponds to one discrete point estimate of utility position and orientation. The system may further include a display device to receive map generation output data and to display the map.

In another aspect, the system may include one or more non-transitory computer-readable memory configured to store the map and associated data. The non-transitory computer-readable memory may be disposed in one or more of the system devices described or in an additional storage device.

In another aspect, the map generation element may be disposed in various system devices. For instance, the map generation element may be disposed in the one or more magnetic field sensing locating devices, a remote server communicatively coupled to the magnetic field sensing locating devices, or another computing device communicatively coupled to the magnetic field sensing locating devices.

In another aspect, the display device may be disposed in various system devices. In some embodiments, the display device may be a display in the one or more magnetic field sensing locating devices and/or a separate computing device.

Details of example utility locating devices and systems that may be combined with the geographic map updating system and method embodiments herein, as well as additional components, methods, and configurations that may be used in conjunction with the embodiments described herein, are disclosed in co-assigned patents and patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 9,625,602, issued Apr. 18, 2017, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCATOR SYSTEM EMPLOYING AUTOMATED VIRTUAL DEPTH EVENT DETECTION AND SIGNALING; U.S. Pat. No. 9,599,499, issued Mar. 21, 2017, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,638,824, issued May 2, 2017, entitled QUAD-GRADIENT COILS FOR USE IN LOCATING SYSTEMS; U.S. patent application Ser. No. 13/677,223, filed Nov. 14, 2012, now U.S. Pat. No. 9,927,545 issued Mar. 27, 2018, entitled MULTI-FREQUENCY LOCATING SYSTEMS AND METHODS; U.S. patent application Ser. No. 13/769,202, filed Feb. 15, 2013, entitled SMART PAINT STICK DEVICES AND METHODS; U.S. patent application Ser. No. 13/774,351, filed Feb. 22, 2013, now U.S. Pat. No. 10,371,305 issued Aug. 6, 2019, entitled DOCKABLE TRIPODAL CAMERA CONTROL UNIT; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. Pat. No. 9,488,747, issued Nov. 8, 2016, entitled DUAL ANTENNA SYSTEMS WITH VARIABLE POLARIZATION; U.S. patent application Ser. No. 13/894,038, filed May 14, 2013, now U.S. Pat. No. 10,042,072 issued Aug. 7, 2018, entitled OMNI-INDUCER TRANSMITTING DEVICES AND METHODS; U.S. patent application Ser. No. 13/958,492, filed Aug. 2, 2013, now U.S. Pat. No. 9,784,837 issued Oct. 10, 2017, entitled OPTICAL ROUND TRACKING APPARATUS, SYSTEMS AND METHODS; U.S. Pat. No. 9,599,740, issued Mar. 21, 2017, entitled USER INTERFACES FOR UTILITY LOCATORS; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, now U.S. Pat. No. 10,024,994 issued Jul. 17, 2018, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. patent application Ser. No. 14/446,145, filed Jul. 29, 2014, now U.S. Pat. No. 10,274,632 issued Apr. 30, 2019, entitled UTILITY LOCATING SYSTEMS WITH MOBILE BASE STATION; U.S. Pat. No. 9,632,199, issued Apr. 25, 2017, entitled INDUCTIVE CLAMP DEVICES, SYSTEMS, AND METHODS; U.S. patent application Ser. No. 14/516,558, filed Oct. 16, 2014, now U.S. Pat. No. 9,746,572 issued Aug. 29, 2017, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. patent application 14/752,834, filed Jun. 27, 2015, now U.S. Pat. No. 9,928,613 issued Mar. 27, 2018, entitled GROUND TRACKING APPARATUS, SYSTEMS, AND METHODS; U.S. patent application Ser. No. 14/797,840, filed Jul. 13, 2015, entitled GROUND-TRACKING DEVICES AND METHODS FOR USE WITH A UTILITY LOCATOR; U.S. patent application Ser. No. 14/798,177, filed Jul. 13, 2015, now U.S. Pat. No. 9,696,488 issued Jul. 4, 2017, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. patent application Ser. No. 14/802,791, filed Jul. 17, 2015, now U.S. Pat. No. 9,959,641 issued May 1, 2018, entitled METHODS AND SYSTEMS FOR SEAMLESS TRANSITIONING IN INTERACTIVE MAPPING SYSTEMS; U.S. Pat. No. 9,085,007, issued Jul. 21, 2015, entitled MARKING PAINT APPLICATOR FOR PORTABLE LOCATOR; U.S. patent application Ser. No. 14/949,868, filed Nov. 23, 2015, now U.S. Pat. No. 10,078,149 issued Sep. 18, 2018, entitled BURIED OBJECT LOCATOR APPARATUS AND SYSTEMS; U.S. patent application Ser. No. 15/006,119, filed Jan. 26, 2016, now U.S. Pat. No. 10,353,103 issued Jul. 16, 2019, entitled SELF-STANDING MULTI-LEG ATTACHMENT DEVICES FOR USE WITH UTILITY LOCATORS; U.S. Pat. No. 9,341,740, issued May 17,2016, entitled OPTICAL GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. patent application Ser. No. 15/250,666, filed Aug. 29, 2016, now U.S. Pat. No. 9,927,546 issued Mar. 27, 2018, entitled PHASE-SYNCHRONIZED BURIED OBJECT TRANSMITTER AND LOCATOR METHODS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. patent application Ser. No. 15/331,570, filed Oct. 21, 2016, now U.S. Pat. No. 10,073,186 issued Sep. 11, 2018, entitled KEYED CURRENT SIGNAL UTILITY LOCATING SYSTEMS AND METHODS; U.S. patent application Ser. No. 15/339,766, filed Oct. 31, 2016, now U.S. Pat. No. 10,031,253 issued Jul. 24, 2018, entitled GRADIENT ANTENNA COILS AND ARRAYS FOR USE IN LOCATING SYSTEMS; U.S. patent application Ser. No. 15/345,421, filed Nov. 7, 2016, entitled OMNI-INDUCER TRANSMITTING DEVICES AND METHODS; U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/376,576, filed Dec. 12, 2016, now U.S. Pat. No. 10,082,599 issued Sep. 25, 2018, entitled MAGNETIC SENSING BURIED OBJECT LOCATOR INCLUDING A CAMERA; U.S. patent application Ser. No. 15/396,068, filed Dec. 30, 2016, now U.S. Pat. No. 10,247,845 issued Apr. 2, 2019, entitled UTILITY LOCATOR TRANSMITTER APPARATUS AND METHODS; U.S. patent application Ser. No. 15/425,785, filed Feb. 6, 2017, entitled METHODS AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/434,056, filed Feb. 16, 2017, now U.S. Pat. No. 10,401,526 issued Sep. 3, 2019, entitled BURIED UTILITY MARKER DEVICES, SYSTEMS, AND METHODS; U.S. patent application Ser. No. 15/457,149, filed Mar. 13, 2017, entitled USER INTERFACES FOR UTILITY LOCATOR; U.S. patent application Ser. No. 15/457,222, filed Mar. 13, 2017, entitled SYSTEMS AND METHODS FOR LOCATING BURIED OR HIDDEN OBJECTS USING SHEET CURRENT FLOW MODELS; U.S. patent application Ser. No. 15/457,897, filed Mar. 13, 2017, now U.S. Pat. No. 10,162,074 issued Dec. 25, 2018, entitled UTILITY LOCATORS WITH RETRACTABLE SUPPORT STRUCTURES AND APPLICATIONS THEREOF; U.S. patent application Ser. No. 15/470,642, filed Mar. 27, 2017, entitled UTILITY LOCATING APPARATUS AND SYSTEMS USING MULTIPLE ANTENNA COILS; U.S. patent application Ser. No. 15/470,713, filed Mar. 27, 2017, entitled UTILITY LOCATORS WITH PERSONAL COMMUNICATION DEVICE USER INTERFACES; U.S. patent application Ser. No. 15/483,924, filed Apr. 10, 2017, now U.S. Pat. No. 10,069,667 issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, filed Apr. 11, 2017, now U.S. Pat. No. 10,082,591 issued Sep. 25, 2018, entitled MAGNETIC UTILITY LOCATOR DEVICES AND METHODS; U.S. patent application Ser. No. 15/485,125, filed Apr. 11, 2017, entitled INDUCTIVE CLAMP DEVICES, SYSTEMS, AND METHODS; U.S. patent application Ser. No. 15/490,740, filed Apr. 18, 2017, entitled NULLED-SIGNAL UTILITY LOCATING DEVICES, SYSTEMS, AND METHODS; U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES; U.S. patent application Ser. No. 15/590,964, filed May 9, 2017, entitled BORING INSPECTION SYSTEMS AND METHODS; U.S. patent application Ser. No. 15/623,174, filed Jun. 14, 2017, now U.S. Pat. No. 10,105,723 issued Oct. 23, 2018, entitled TRACKABLE DIPOLE DEVICES, METHODS, AND SYSTEMS FOR USE WITH MARKING PAINT STICKS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. patent application Ser. No. 15/633,682, filed Jun. 26, 2017, now U.S. Pat. No. 9,989,662 issued Jun. 5, 2018, entitled BURIED OBJECT LOCATING DEVICES AND METHODS; U.S. patent application Ser. No. 15/681,409, filed Aug. 20, 2017, entitled WIRELESS BURIED PIPE AND CABLE LOCATING SYSTEMS; U.S. Pat. No. 9,798,033, issued Oct. 24, 2017, entitled SONDE DEVICES INCLUDING A SECTIONAL FERRITE CORE; U.S. Provisional Patent Application 15/811,361, filed Nov. 13, 2017, entitled OPTICAL GROUND TRACKING APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, filed Dec. 18, 2017, entitled SYSTEMS AND METHODS FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. patent application Ser. No. 15/870,787, filed Jan. 12, 2018, entitled MAGNETIC FIELD CANCELING AUDIO SPEAKERS FOR USE WITH BURIED UTILITY LOCATORS OR OTHER DEVICES; U.S. patent application Ser. No. 15/877,230, filed Jan. 22, 2018, entitled UTILITY LOCATING TRANSMITTER APPARATUS AND METHODS; U.S. Provisional Patent Application 62/620,959, filed Jan. 23, 2018, now U.S. patent application Ser. No. 16/255,524 filed Jan. 23, 2019, entitled RECHARGEABLE BATTERY PACK ONBOARD CHARGE STATE INDICATION METHODS AND APPARATUS; U.S. Pat. No. 9,880,309, issued Jan. 30, 2018, entitled UTILITY LOCATOR TRANSMITTER APPARATUS AND METHODS; U.S. patent application Ser. No. 15/889,067, filed Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. Provisional Patent Application Ser. No. 62/656,259, filed Apr. 11, 2018, now U.S. patent application Ser. No. 16/382,136 filed Apr. 11, 2019, entitled GEOGRAPHIC MAP UPDATING METHODS AND SYSTEMS; U.S. Provisional Patent Application Ser. No. 62/688,259, filed Jun. 21, 2018, entitled ACTIVE MARKER DEVICES FOR UNDERGROUND USE, now U.S. patent application Ser. No. 16/255,524 filed Jan. 23, 2019 and entitled ELECTROMAGNETIC MARKER DEVICES FOR BURIED OR HIDDEN USE, and U.S. Utility Patent Application Ser. No. 16/144,878, filed Sep. 27, 2018, entitled MULTIFUNCTION BURIED UTILITY LOCATING CLIPS. The content of each of the above-described patents and applications is incorporated by reference herein in its entirety. The above applications may be collectively denoted herein as the "co-assigned applications" or "incorporated applications."

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure. As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Various additional aspects, features, devices, systems, and functionality are further described below in conjunction with the appended Drawings.

Figure 1:
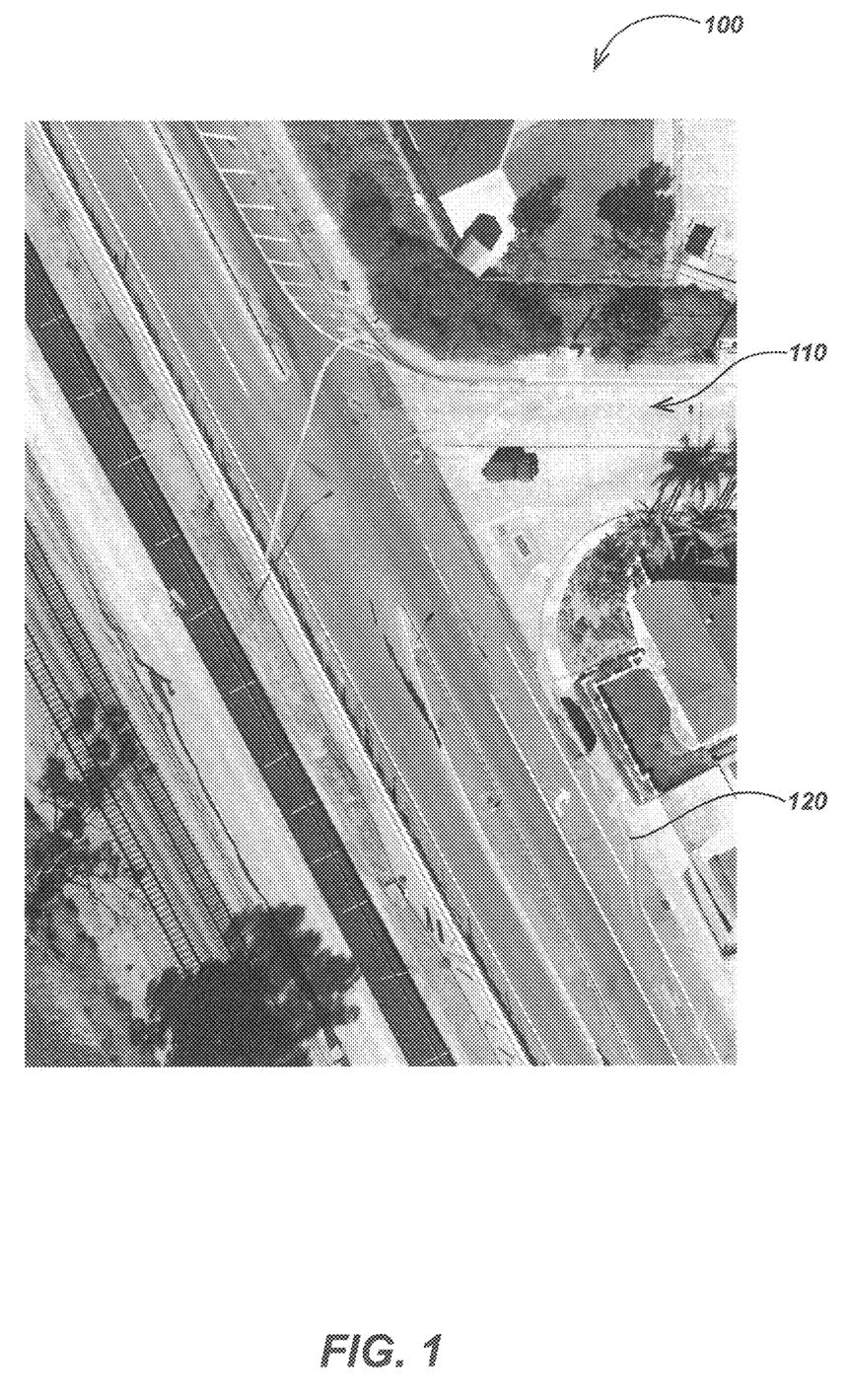
FIG. 1 is a utility map generated by the methods and systems of the present disclosure.

Example Methods and Systems for Map Generation Base on Magnetic Field Data Predictive of Utility Locations FIG. 1 is an image of a utility map 100 generated with the methods and systems described in the present disclosure. The utility map 100 may comprise a base map 110 of a geographical region containing a series of line segments 120. Each line segment 120 may be estimative of a utility line location at a point on the Earth's surface as measured at a discrete point.

In some map embodiments, such as the utility map 100 of FIG. 1, each segment 120 may be color coded according to aspects of the geographic location associated with the discrete point of utility line position and orientation estimation. For instance, the selected color of each line segment 120 may reference measured signal strength, current, phase, a utility position and orientation estimating device velocity, and/or depth of utility. For example, the line segment length may be proportional to data collection velocity and/or the opacity of each line segment may correspond to a quality metric of the data. Various other characteristics of each line segment may likewise be altered to communicate information regarding the geographic location associated with the discrete point of utility line position and orientation estimation which may include details regarding the utility line at that location. Line segment color or saturation, line width or length, pattern or styling of line, and/or opacity may all be changed to communicate such information.

Figure 2A:
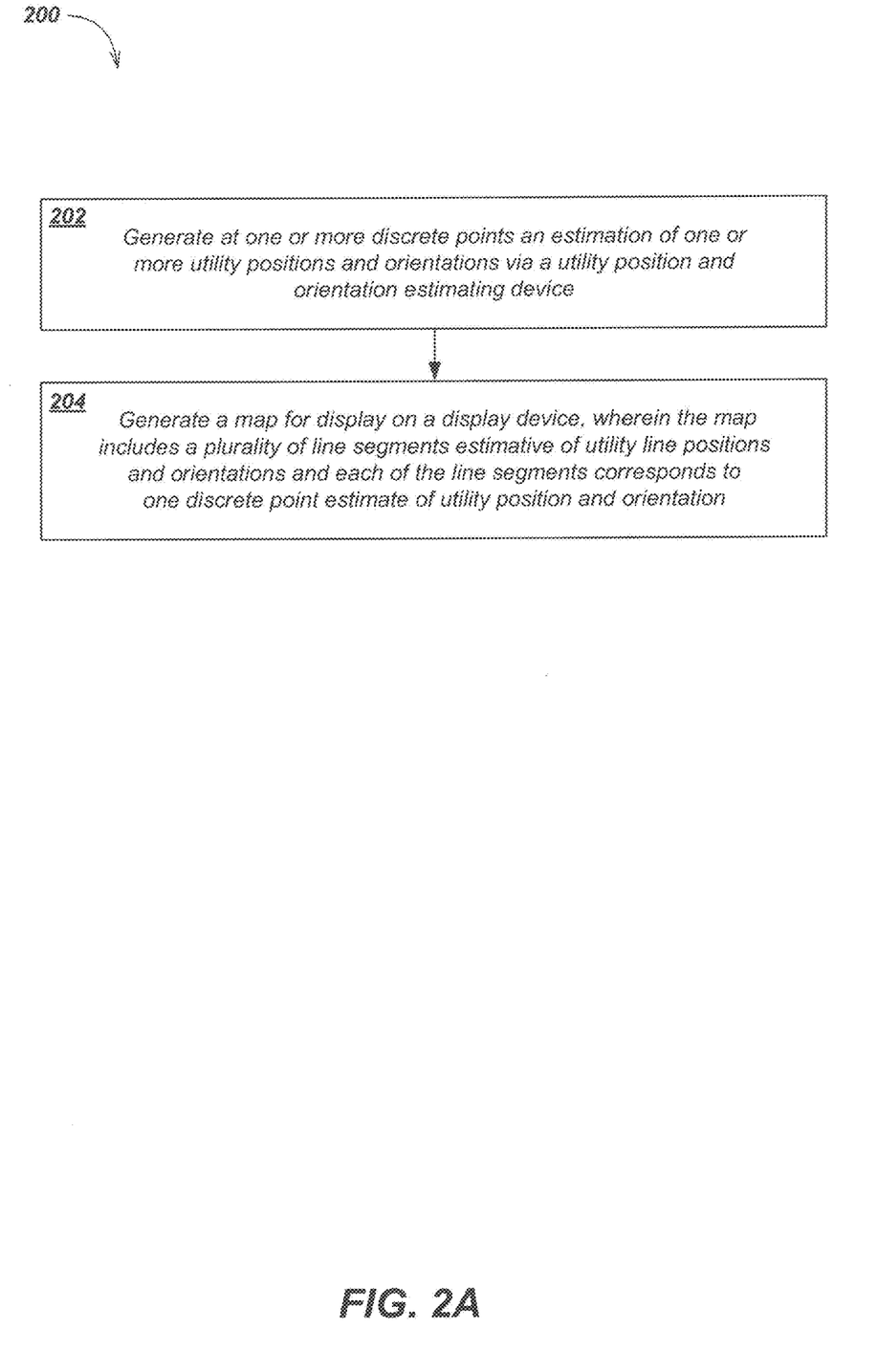
FIG. 2A is a method for map generation based on data estimative of utility locations.

Turning to FIG. 2A, a method 200 describes a method of map generation in keeping with the present disclosure. The method 200 may include a step 202 generating an estimation of one or more utility positions and orientations via a utility position and orientation estimating device at one or more discrete points. In another step 204, method 200 may include generating a map for display on a display device, wherein the map includes a plurality of line segments estimative of utility line positions and orientations, and each of the line segments corresponds to one discrete point estimate of utility position and orientation.

Figure 2B:
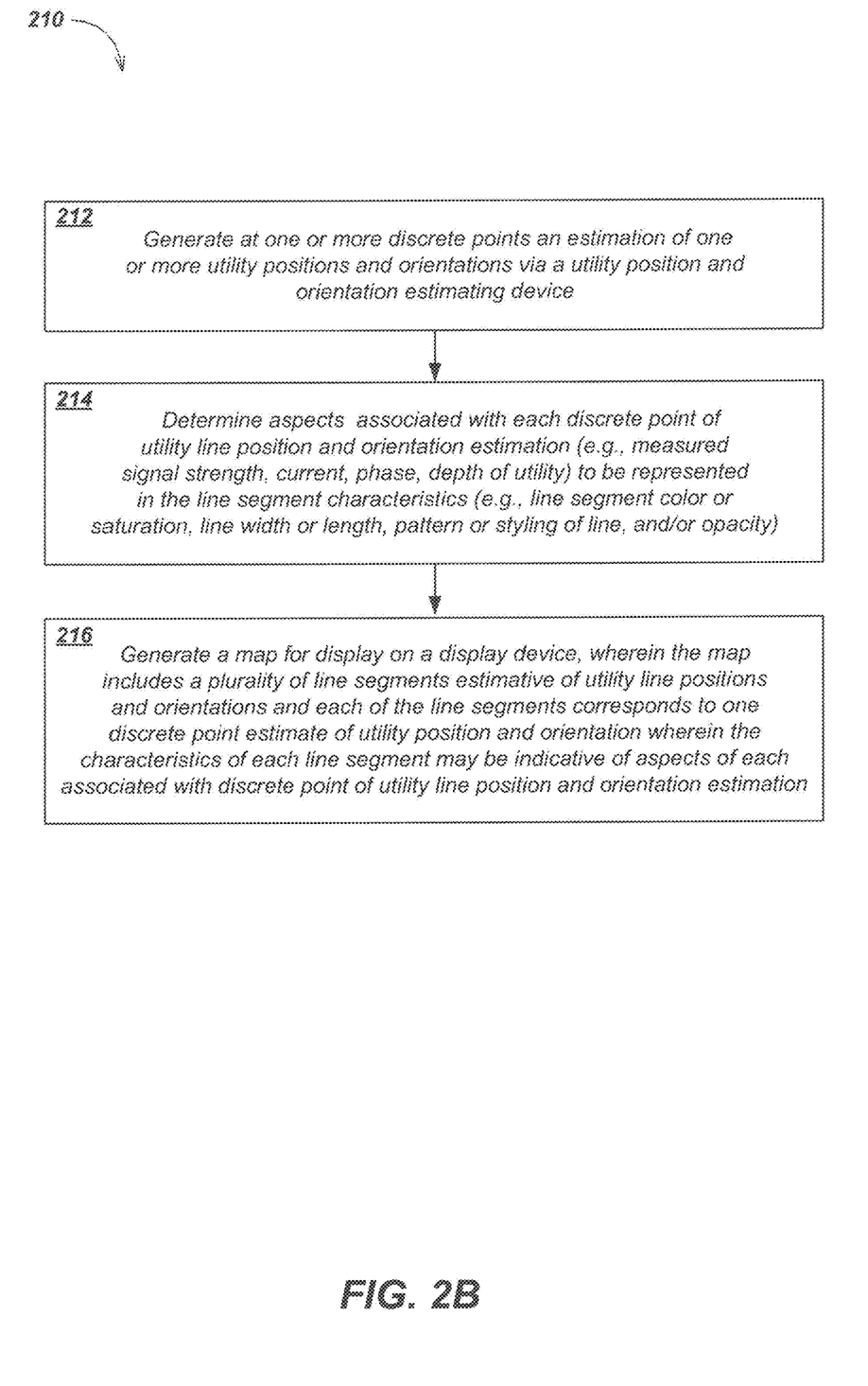
FIG. 2B is another method for map generation based on data estimative of utility locations.

Turning to FIG. 2B, a method 210 describes another method for map generation in keeping with the present disclosure that includes altering characteristics of the line segment (e.g., line segment color or saturation, opacity, line width or length, line style, or the like) to communicate various aspects associated with a discrete point of utility line position and orientation estimation (e.g., measured signal strength, current, phase, utility position and orientation estimating devices velocity over the ground, depth of utility). For example, the line segment length may be proportional to data collection velocity and/or the opacity of each line segment may correspond to a quality metric of the data. The method 210 may include a step 212 generating an estimation of one or more utility positions and orientations via a utility position and orientation estimating device at one or more discrete points. In another step 214, the method 210 may include determining aspects associated with a discrete point of utility line position and orientation estimation (e.g., measured signal strength, current, phase, depth of utility) to be represented in the line segment characteristics (e.g., line segment color or saturation, line width or length, pattern or styling of line, and/or opacity). In a step 216, the method 210 includes generating a map for display on a display device, wherein the map includes a plurality of line segments estimative of utility line positions and orientations, and each of the line segments corresponds to one discrete point estimate of utility position and orientation wherein the characteristics of each line segment may be indicative of aspects of each associated discrete point of utility line position and orientation estimation.

Figure 2C:
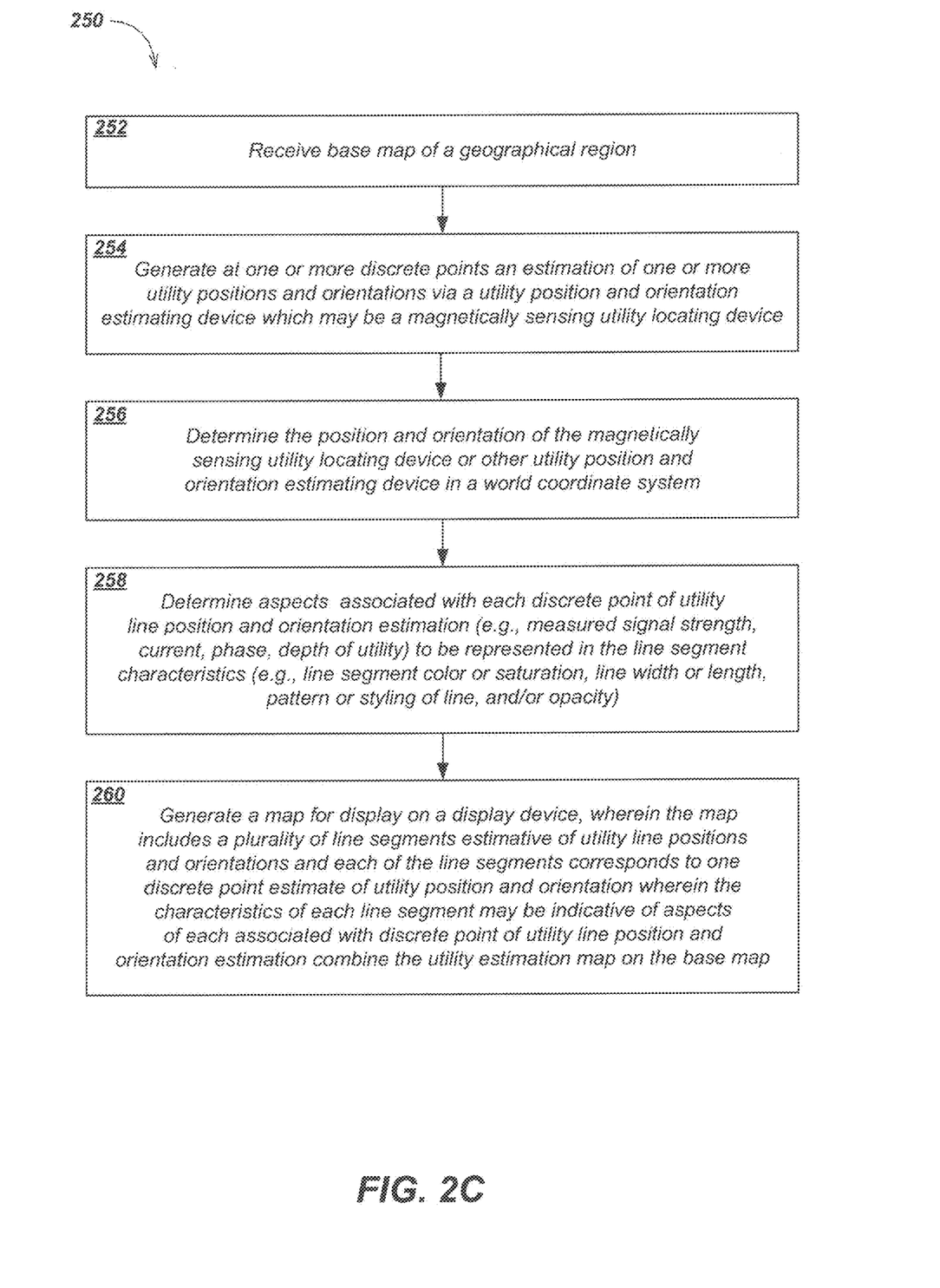
FIG. 2C is another method for map generation based on data estimative of utility locations.

Turning to FIG. 2C, a method 250 describes another method for map generation in keeping with the present disclosure. A step 252 includes receiving a base map of a geographical region. In a step 254, the method 250 includes generating estimations of one or more utility positions and orientations via a utility position and orientation estimating device at one or more discrete points which may be or include a magnetically sensing utility locating device or other utility position and orientation estimating device. In a step 256, the method 250 includes determining the position and orientation of the magnetically sensing utility locating device in a world coordinate system. For instance, the device may include global position satellite (GPS) or other global navigation satellite system (GNSS) receivers to determine position in a world coordinate system. Likewise, the device may include gyroscope(s), compass(es), accelerometers, and/or other inertial navigation sensors to determine the orientation of the device at the device's position. In a step 258, the method 250 includes determining aspects associated with each discrete point of utility line position and orientation estimations (e.g., measured signal strength, current, phase, magnetically sensing utility locating device velocity over the ground, depth of utility) to be represented in the line segment characteristics (e.g., line segment color or saturation, line width or length, pattern or styling of line, and/or opacity). For example, the line segment length may be proportional to data collection velocity and/or the opacity of each line segment may correspond to a quality metric of the data. In a step 260, the method 250 includes generating a map for display on a display device, wherein the map includes a plurality of line segments estimative of utility line positions and orientations and each of the line segments corresponds to one discrete point estimate of utility position and orientation wherein the characteristics of each line segment may be indicative of aspects of each associated discrete point of utility line position and orientation estimation combining the utility estimation map on the base map.

Figure 2D:
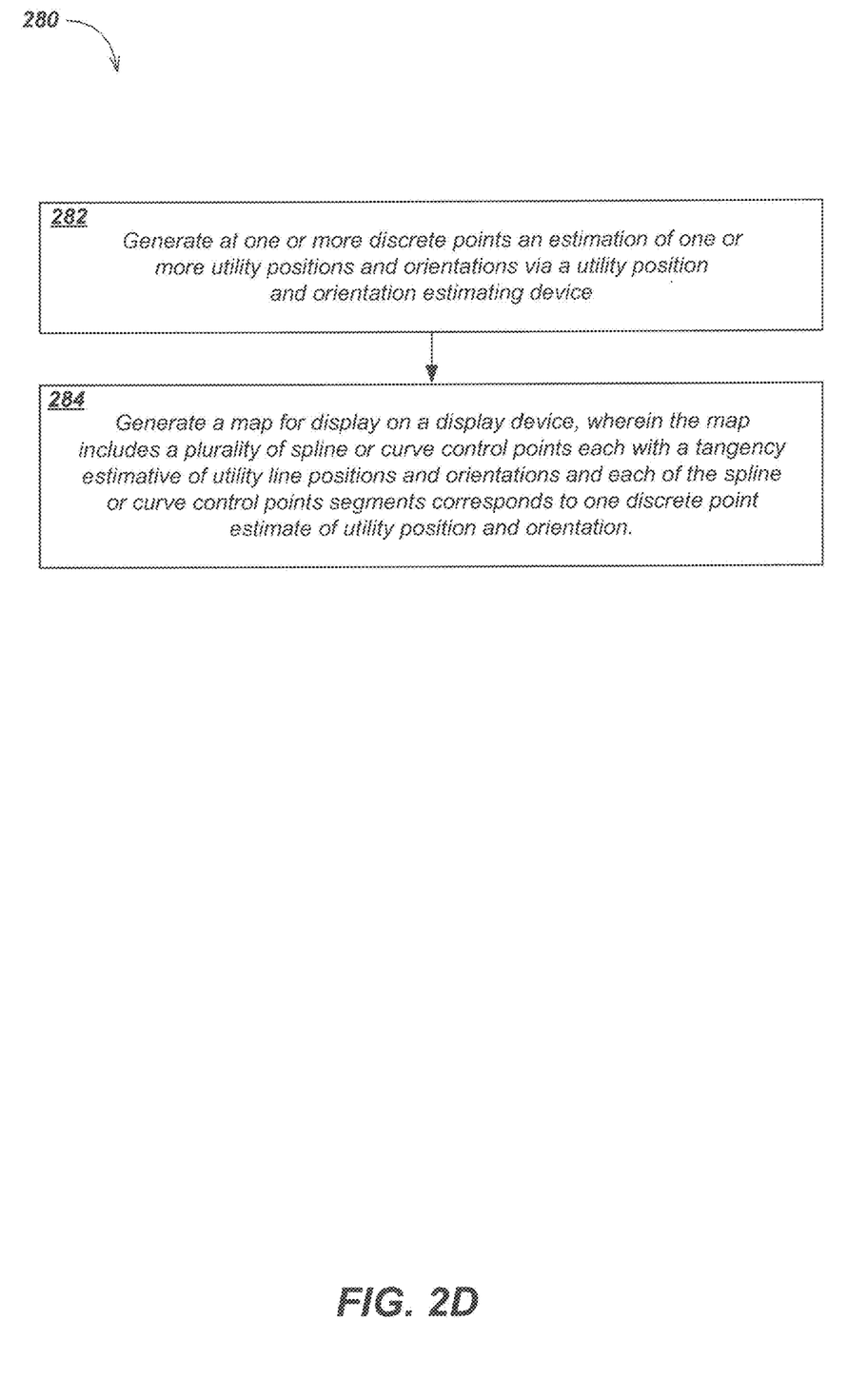
FIG. 2D is another method for map generation based on data estimative of utility locations.

Turning to FIG. 2D, a method 280 describes another method for map generation in keeping with the present disclosure. In a step 282, the method 280 includes generating at one or more discrete points an estimation of one or more utility positions and orientations via a utility position and orientation estimating device. In a step 284, the method 280 includes generating a map for display on a display device, wherein the map includes a plurality of spline or curve control points each with a tangency estimative of utility line positions and orientations, and each of the spline or curve control points segments corresponds to one discrete point estimate of utility position and orientation.

Figure 3:
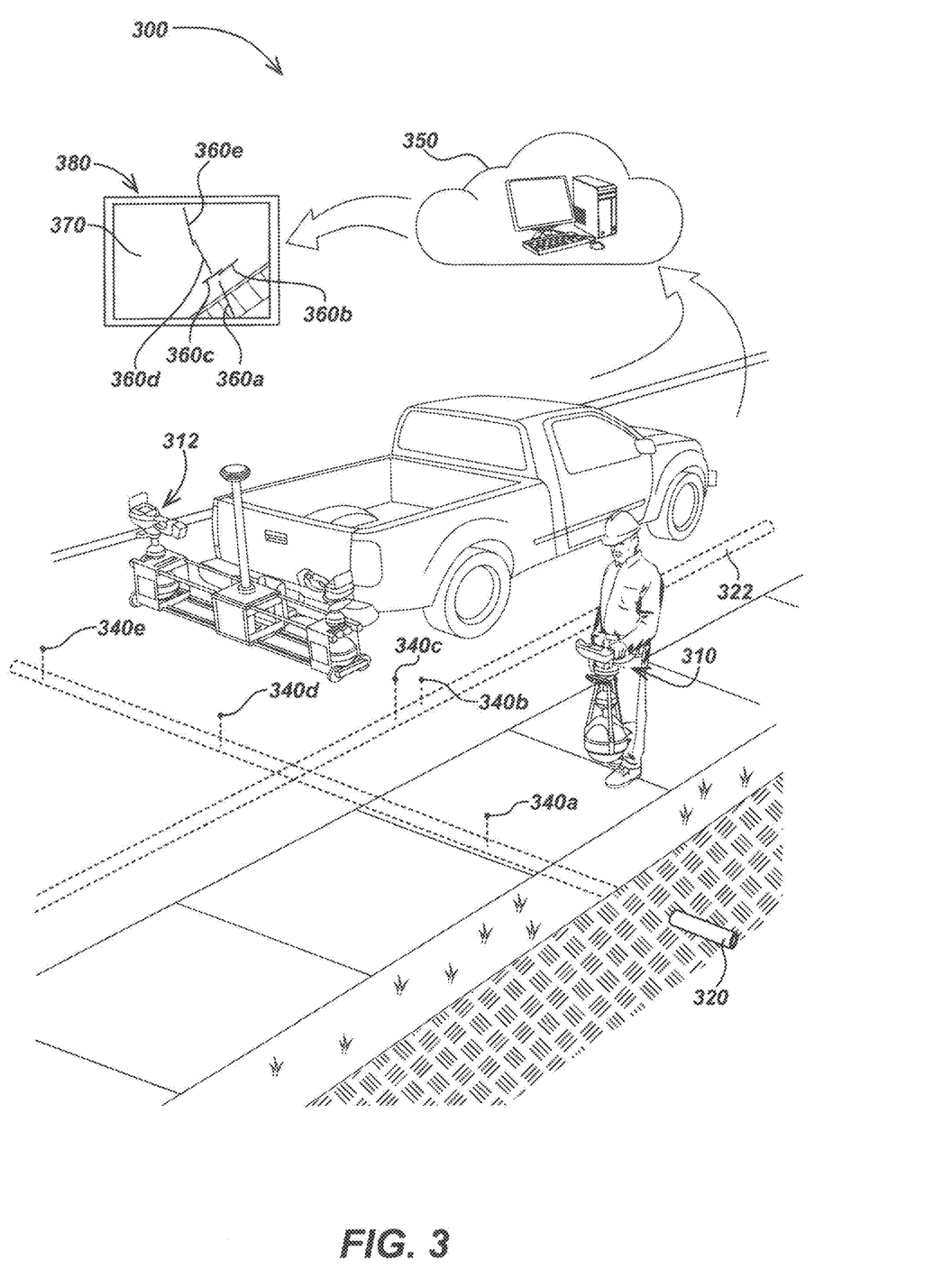
FIG. 3 is an illustration of a utility locating and mapping system.

Turning to FIG. 3, a utility locating and mapping system 300 is illustrated. The system 300 may include one or more utility position and orientation estimating devices such as the hand-carried magnetic field sensing locating device 310 and the vehicle-mounted magnetic field sensing locating device 312. Each locating device 310 and 312 may comprise at least one antenna node to sense magnetic fields emitted from buried utilities, such as utility line 320 and utility line 322, at one or more discrete points in the surveyed area, such as points 340a, 340b, 340c, 340d, and 340e, and may provide antenna output signals corresponding to the sensed magnetic fields. The locating devices 310 and 312 include a receiver circuit to receive and process the at least one antenna node output signals to provide receiver output signals corresponding to the received magnetic field signals that is coupled to a processing unit. The system 300 may include a position and orientation element, which may determine the position and orientation of the magnetic field sensing locating device in a world coordinate system. For instance, each magnetic field sensing locating device or other utility position and orientation estimating device may include global position satellite (GPS) or other global navigation satellite system (GNSS) receivers to determine position in a world coordinate system. Likewise, the device may include gyroscope(s), compass(es), accelerometers, and/or other inertial navigation sensors to determine the orientation of the device at the device's position. A processing unit may receive receiver output signals and position and orientation output signals and generate at the discrete points 340*a*, 340*b*, 340*c*, 340*d*, and 340*e* an estimation of one or more utility positions and orientations via a utility position and orientation estimating device.

Details of example hand-carried and vehicle mounted magnetic field sensing locating devices as may be used in combination with the disclosures herein in various system embodiments are described in the various incorporated co-assigned patents and patent applications. In some embodiments, the magnetic field sensing locating devices may be configured to determine gradient tensors at a point and map that measurement, through a model of a current-carrying utility to an estimate of the utility position and orientation as described in the co-assigned patents and patent applications including: U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; and U.S. patent application Ser. No. 16/125,768, filed Sep. 10, 2018, entitled BURIED OBJECT LOCATORS WITH MULTI-COIL ANTENNA ARRAYS. The content of each of the above-described patents and applications is incorporated by reference herein in its entirety.

The system 300 of FIG. 3 may further include a map generation element, such as a cloud computer 350, to receive the utility line position and orientation estimates at each discrete point 340*a*, 340*b*, 340*c*, 340*d*, and 340*e* and generate a map 370 including a plurality of line segments 360*a*, 360*b*, 360*c*, 360*d*, and 360*e* estimative of utility line positions and orientations wherein each of the line segments 360*a*, 360*b*, 360*c*, 360*d*, and 360*e* corresponds to one discrete point 340*a*, 340*b*, 340*c*, 340*d*, and 340*e*. In other embodiments, the map generation element may be or include other communicatively coupled computing devices and/or may be disposed in the magnetic field sensing locating devices 310 and/or 312. The display device 380 may be or include a variety of devices to display a digital map, such as map 370, including but not limited to one or more computing devices (e.g., tablets, smart phones, laptop or desktop computers, or the like) and/or may be disposed in the magnetic field sensing locating devices 310 and/or 312. In further embodiments, the display device may be disposed in various excavating tools. For instance, a display may be disposed in the console of a backhoe or like digging device to allow a utility map such as the map 370 to be displayed during excavation.

Figure 4:
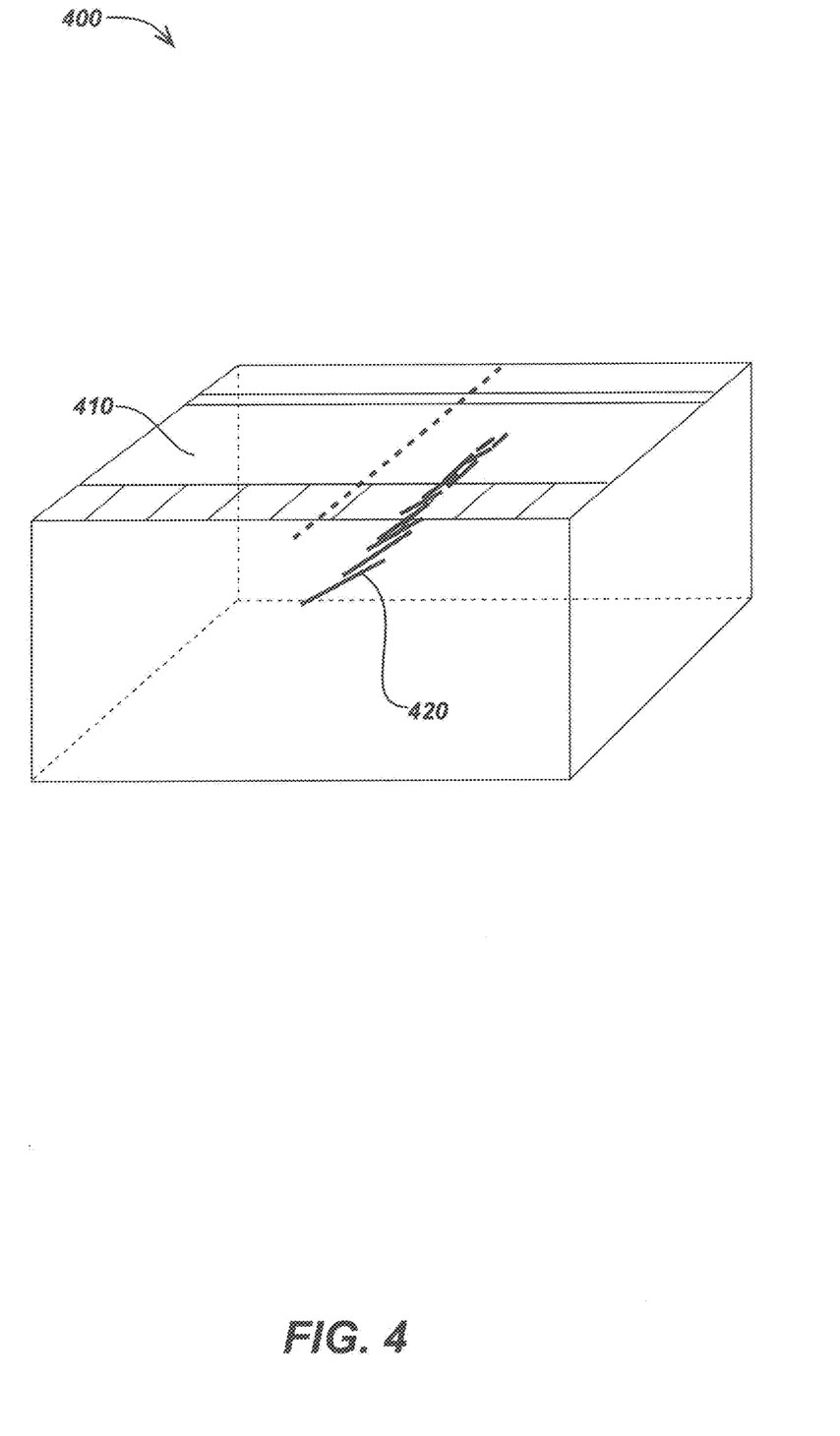
FIG. 4 is an illustration of a 3D utility map.

In some embodiments, the map may be three dimensional. For instance, the utility map 400 of FIG. 4 comprises a three dimensional base map 410 onto which a series of line segments 420 may be included revealing the estimated depth of the utility line in the ground. The line segments 420 may have a slope in three dimensions wherein a three dimensional estimation of the orientation of the utility line is determined. In other embodiments, the line segments 420 of a three dimensional map may exist in a horizontal plane and be placed at the depth measured by the utility position and orientation estimating device. In some three dimensional map embodiments, each line segment may have characteristics (e.g., line segment color or saturation, line width or length, pattern or styling of line, and/or opacity) controlled to represent aspects associated with each discrete point location (e.g., measured signal strength, current, phase, utility position and orientation estimating devices velocity over the ground, depth of utility). For example, the line segment length may be proportional to data collection velocity and/or the opacity of each line segment may correspond to a quality metric of the data.

In one or more exemplary embodiments, certain functions, methods and processes described herein related to the map generation systems and methods disclosed herein may be implemented in hardware, software, firmware or any combination thereof If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed herein are examples of exemplary approaches. Based upon design preferences, it is understood that the specific order or hierarchy of steps or stages in the processes may be rearranged while remaining within the scope of the present disclosure. Any accompanying method claims present elements of the various steps in a sample order and are not meant to be limited to the specific order or hierarchy presented unless explicitly noted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles or any combination thereof Those of skill would further appreciate that the various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein and, for example, in processing elements as described herein may be implemented or performed with a general purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. A processing element may further include or be coupled to one or more memory elements for storing instructions, data and/or other information in a non-transitory digital storage format.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, CD-ROMs or any other form of storage medium known or developed in the art. An exemplary storage medium is coupled to the processor such that the processor can read information from and write information to the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the disclosure is not intended to be limited to the aspects shown herein, but is to be accorded the full scope consistent with the language of this specification and accompanying drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the invention. Thus, the scope of the invention is not intended to be limited to the aspects shown herein but is to be accorded the widest scope consistent with the following claims and their equivalents.

We claim:

1. A method of mapping utility information, comprising:
    generating an estimation of a utility position and orientation with a utility position and orientation estimating device at a plurality of discrete points; and
    generating a composite map, wherein a line segment map is combined onto a base map of a geographical region to generate the composite map, wherein the line segment map includes a plurality of line segments estimative of utility line positions and orientations and each of the line segments corresponds to one discrete point of the plurality of discrete points.

2. The method of claim 1, wherein the utility position and orientation estimating device is a magnetic field sensing locating device configured to measure magnetic signals emitted by a utility line.

3. The method of claim 1, wherein the position and orientation of the utility position and orientation estimating device is determined in a world coordinate system.

4. The method of claim 1, wherein the map and estimated utility line positions and orientations are stored in a non-transitory computer readable memory.

5. The method of claim 1, wherein aspects of a geographical location associated with discrete point of utility line position and orientation estimations are represented in one or more line segment characteristics.

6. The method of claim 5, wherein the characteristic of the line segment includes color or color saturation.

7. The method of claim 5, wherein the characteristic of the line segment includes the line width or length.

8. The method of claim 5, wherein the characteristic of the line segment includes the line styling or pattern.

9. The method of claim 5, wherein the characteristic of the line segment includes opacity.

10. The method of claim 5, wherein the data generated from the geographical location at the associated discrete point of utility line position and orientation estimation includes signal strength of a measured signal.

11. The method of claim 5, wherein the data generated from the geographical location at the associated discrete point of utility line position and orientation estimation includes current of a measured signal.

12. The method of claim 5, wherein the data generated from the geographical location at the associated discrete point of utility line position and orientation estimation includes phase of a measured signal.

13. The method of claim 5, wherein the data generated from the geographical location at the associated discrete point of utility line position and orientation estimation includes estimations of the depth of the utility line in the ground.

14. The method of claim 5, wherein the data generated from the geographical location at the associated discrete point of utility line position and orientation estimation includes estimations of utility position and orientation estimating device velocity over the ground.

15. The method of claim 1, wherein the map is a three dimensional map.

16. A system for generating maps from magnetic field utility line position and orientation estimates, comprising:
    one or more magnetic field sensing locating devices including one or more of vehicle-mounted magnetic field sensing locating devices and/or hand-carried magnetic field sensing locating devices, each of the plurality of magnetic field sensing locating devices comprising:
    at least one antenna node to sense magnetic fields emitted from a plurality of buried utilities at various discrete point locations in time and space along the Earth's surface and provide antenna output signals corresponding to the sensed magnetic fields at each discrete time and space location, wherein the antenna nodes comprise dodecahedral antenna array providing the outputs from twelve antennas of the dodecahedral antenna array;

a receiver circuit to receive and process the antenna node output signals to provide receiver output signals corresponding to the received magnetic field signals;

a position and orientation element to determine the position and orientation of the magnetic field sensing locating device in a world coordinate system; and a processing unit coupled to the receiver output to receive the receiver output signals and position and orientation output signals and generate at one or more discrete points an estimation of one or more utility positions and orientations via a utility position and orientation estimating device;

a map generation element to receive the processing unit data and generate a map including a plurality of line segments estimative of utility line positions and orientations wherein each of the line segments corresponds to one discrete point estimate of utility position and orientation, wherein the map is combined onto a base map of a geographical region; and a display device to receive map generation element data and to display the map.

17. The system of claim 16, further including a non-transitory computer-readable memory configured to store the map and associated data.

18. The system of claim 16, wherein the map generation element is disposed in the one or more magnetic field sensing locating devices.

19. The system of claim 16, wherein the map generation element is disposed in a remote server communicatively coupled to the magnetic field sensing locating devices.

20. The system of claim 16, wherein the map generation element is disposed in a computing device communicatively coupled to the magnetic field sensing locating devices.

21. The system of claim 16, wherein the display device is disposed in the one or more magnetic field sensing locating devices.

22. The system of claim 16, wherein the display device is coupled to a computing device.

23. A method of mapping utility information, comprising:
generating an estimation of one or more utility positions and orientations via a utility position and orientation estimating device comprising a dodecahedral antenna array for sensing output signals from one or more utilities at a plurality of discrete points; and generating a map for display on a display device, wherein the map includes a plurality of spline or curve control points each with a tangency estimative of utility line positions and orientations and each of the spline or curve control points segments corresponds to one discrete point estimate of utility position and orientation.

24. The method of claim 2, wherein the magnetic field sensing locating device comprises a dodecahedral antenna array and a receiver to receive output signals from twelve antennas of the dodecahedral antenna array and processes the output signals to generate the line segments estimative of utility line positions and orientations.

25. The method of claim 1, wherein the base map comprises a photographic image.

* * * * *